United States Patent
Xu et al.

(10) Patent No.: US 11,667,785 B2
(45) Date of Patent: *Jun. 6, 2023

(54) THERMOPLASTIC ELASTOMER COMPOUNDS EXHIBITING IMPROVED STAIN RESISTANCE

(71) Applicant: PolyOne Corporation, Avon Lake, OH (US)

(72) Inventors: Liang Xu, Vernon Hills, IL (US); Christopher Engel, Cary, IL (US)

(73) Assignee: Avient Corporation, Avon Lake, OH (US)

( * ) Notice: Subject to any disclaimer, the term of this patent is extended or adjusted under 35 U.S.C. 154(b) by 119 days.

This patent is subject to a terminal disclaimer.

(21) Appl. No.: 16/606,129

(22) PCT Filed: Apr. 24, 2018

(86) PCT No.: PCT/US2018/029110
§ 371 (c)(1),
(2) Date: Oct. 17, 2019

(87) PCT Pub. No.: WO2018/200499
PCT Pub. Date: Nov. 1, 2018

(65) Prior Publication Data
US 2020/0048450 A1 Feb. 13, 2020

Related U.S. Application Data

(60) Provisional application No. 62/489,631, filed on Apr. 25, 2017, provisional application No. 62/609,916, filed on Dec. 22, 2017.

(51) Int. Cl.
*C08L 53/00* (2006.01)
*C08F 220/18* (2006.01)
*C08G 77/16* (2006.01)

(52) U.S. Cl.
CPC ............ *C08L 53/00* (2013.01); *C08F 220/18* (2013.01); *C08G 77/16* (2013.01); *C08F 220/1804* (2020.02); *C08L 2201/10* (2013.01); *C08L 2203/20* (2013.01); *C08L 2207/04* (2013.01)

(58) Field of Classification Search
CPC ................ C08L 53/00; C08L 2203/20; C08L 2207/04; C08F 220/18; C08F 2220/1825; C08G 77/16
USPC ........................................................ 524/505
See application file for complete search history.

(56) References Cited

U.S. PATENT DOCUMENTS

| | | | |
|---|---|---|---|
| 5,654,366 A | 8/1997 | Furukawa et al. | |
| 8,299,176 B2 | 10/2012 | Guerret et al. | |
| 9,663,651 B2 | 5/2017 | Kim et al. | |
| 2008/0315270 A1 | 12/2008 | Marsh et al. | |
| 2012/0015202 A1 | 1/2012 | Kenens et al. | |

FOREIGN PATENT DOCUMENTS

| | | | |
|---|---|---|---|
| CN | 1376187 A | | 10/2002 |
| EP | 0728809 B1 | | 1/1998 |
| EP | 1832613 A | | 9/2007 |
| EP | 3251840 A | | 12/2017 |
| JP | 2005-154637 A | | 6/2005 |
| JP | 2006-045418 A | | 2/2006 |
| JP | 2006-335996 A | | 12/2006 |
| JP | 2007070460 | * | 3/2007 |
| JP | 2007-070460 A | | 6/2007 |
| JP | 4199666 B2 | | 12/2008 |
| JP | 2010-241961 A | | 10/2010 |
| KR | 10-2000-0075768 A | | 12/2000 |
| KR | 10-2017-0039249 A | | 4/2017 |

OTHER PUBLICATIONS

Oertel et al., TPE Magazine International, vol. 2, 30-35, 2010. (Year: 2010).*
ShinEtsu, Silicone Fluids, downloaded Jan. 6, 2021. (Year: 2021).*
Translation of JP 2007-070460 (patens application 2005-258757), Mar. 22, 2007. (Year: 2007).*
European Application No. 18790483.4, Extended European Search Report dated Jan. 12, 2021.
European Application No. 18791836.2, Extended European Search Report dated Dec. 17, 2020.
Kuraray Co., Ltd., Kurarity: A Novel Acrylic Block Copolymer, 1st Ed. (2014).
Evonik Resource Efficiency GmbH, TERGOMER H-Si 2315, Technical Data Sheet (Oct. 2016).
Oertel et al., Acrylic TPE approaching automotive, TPE Magazine, 1, pp. 30-35 (2010).
Monineau et al., Synthesis and Characterization of Poly(methyl methacrylate)-block-poly(n-butyl acrylate)-block-poly (methyl metacrylate) Copolymers by Two-Step Controlled Radical Polymerization (ATRP) Catalyzed by NiBr2(PPH3)2, Macromolecules, vol. 32, No. 25, pp. 8277-8282 (1999).
Riehle et al., Influence of PDMS molecular weight on transparency and mechanical properties of soft polysiloxane-urea-elastomers for intraocular lens application, European Polymer Journal, vol. 101, pp. 190-201 (2018).
Shin-Etsu Silicone, Silicone Fluids: The Difference between "Straight" and "Modified" Silicone Fluids, https://www.shinetsusilicone-global.com/products/type/oil/detail/about/index.shtml, last accessed Jan. 6, 2021.
Tong et al., Synthesis, Morphology, and Mechanical Properties of Poly(methylmethacrylate)-b-poly(n-butyl acrylate)-b-poly(methyl methacrylate) Triblocks. Ligated Anionic Polymerization vs Atom Transfer Radical Polymerization, Macromolecules, vol. 33, No. 2, pp. 470-479 (2000).

(Continued)

*Primary Examiner* — Hui H Chin
(74) *Attorney, Agent, or Firm* — Michael J. Sambrook; Emily E. Vlasek; David V. Monateri

(57) ABSTRACT

A thermoplastic elastomer compound includes acrylic block copolymer and functionalized polysiloxane. Polymeric articles formed from the thermoplastic elastomer compound can have improved stain resistance, while also achieving other desirable properties such as low tackiness (i.e., low coefficient of friction) and good clarity (i.e., low haze).

16 Claims, 4 Drawing Sheets

(56) References Cited

OTHER PUBLICATIONS

Tong et al., Synthesis of poly(methyl methacrylate)-b-poly(n-butyl acrylate)-b-poly(methyl metacrylate) triblocks and their potential as thermoplastic elastomers, Polymer, vol. 41, pp. 2499-2510 (2000).
U.S. Appl. No. 16/605,998, Non-Final Office Action dated Jan. 12, 2021.
CN Application No. 201880027248.3, Office Action dated Aug. 23, 2021.
Reddy, Karuna; Final Office Action for U.S. Appl. No. 16/605,998 (dated Apr. 27, 2022).
Reddy, Karuna; Office Action for U.S. Appl. No. 16/605,998 (dated Dec. 30, 2021).
Reddy, Karuna; Final Office Action for U.S. Appl. No. 16/605,998 (dated Jun. 15, 2021).
Reddy, Karuna; Office Action for U.S. Appl. No. 16/605,998 (dated Jan. 12, 2021).

\* cited by examiner

THERMOPLASTIC ELASTOMER COMPOUNDS EXHIBITING IMPROVED STAIN RESISTANCE

CLAIM OF PRIORITY

This application claims priority from U.S. Provisional Patent Application Ser. Nos. 62/489,631 filed on Apr. 25, 2017, and 62/609,916 filed on Dec. 22, 2017, each of which is incorporated by reference in its entirety.

FIELD OF THE INVENTION

This invention relates to thermoplastic elastomer compounds and polymeric articles formed therefrom that have improved resistance to staining, while also achieving other desirable properties.

BACKGROUND OF THE INVENTION

Demand exists for polymeric materials that are useful for making protective cases and other components or accessories for personal electronic devices such as smart phones, tablets, and handheld computers.

Protective cases for personal electronic devices typically require good aesthetics such as "look" and "feel" that are desirable to consumers. For example, some consumers prefer the look of protective cases that are relatively clear in appearance or that are lightly or brightly colored. Further, some consumers prefer the feel of protective cases that are relative soft to the touch without being sticky or tacky.

Thermoplastic elastomers (TPE), which are polymeric materials that exhibit elasticity while remaining thermoplastic, can be useful for making protective cases for personal electronic devices. TPEs can include styrenic block copolymers (SBC), thermoplastic vulcanizates (TPV), thermoplastic polyolefins (TPO), copolyesters (COPE), thermoplastic polyurethanes (TPU), copolyamides (COPA), olefinic block copolymers (OBC). Although certain TPEs can offer many properties desirable for making protective cases for personal electronic devices, drawbacks still exist.

For example, protective cases made from conventional TPEs can suffer from poor resistance to abrasion and staining when personal electronic devices are placed by users in garments or clothing articles made from denim or other dyed fabrics, such as in a pocket of blue jeans. Disadvantageously, it is possible for such protective cases to be abraded by the fabric and stained by dye that transfers from the fabric. Such abrasion and staining is especially problematic when protective cases are clear or lightly or brightly colored.

Acrylic block copolymers (ABC) are another class of TPE. Unfortunately, polymeric articles molded from currently commercially available ABC typically have a level of surface tackiness that is typically undesirable for applications such as protective cases for personal electronic devices.

SUMMARY OF THE INVENTION

Consequently, a need exists for thermoplastic elastomer compounds and polymeric articled formed therefrom that have improved resistance to abrasion and staining while also achieving other properties, such as low tackiness (i.e., low coefficient of friction) and good clarity (i.e., low haze), which are especially desirable for certain applications.

The aforementioned needs are met by one or more aspects of the present invention.

Surprisingly, it has been found that, by adding functionalized polysiloxane to acrylic block copolymer, it is possible to provide a thermoplastic elastomer compound and polymeric articles formed therefrom having improved resistance to abrasion and staining while also achieving other desirable properties.

One aspect of the invention is a thermoplastic elastomer compound that includes acrylic block copolymer and functionalized polysiloxane.

Another aspect of the invention is a polymeric article formed from a thermoplastic elastomer compound as described herein. The polymeric article can have improved resistance to Blue Jean Staining (defined herein) and can be Blue Jean Stain Resistant (defined herein).

A further aspect of the invention is a method of making a polymeric article. The method includes steps of providing a thermoplastic elastomer compound as described herein, and forming the thermoplastic elastomer compound to provide the polymeric article. The polymeric article is Blue Jean Stain Resistant (defined herein).

An even further aspect of the invention is a method of improving resistance to Blue Jean Staining (defined herein) of a polymeric article. The method includes a step of using the thermoplastic elastomer compound as described herein to form the polymeric article.

Features of the invention will become apparent with reference to the following embodiments. There exist various refinements of the features noted in relation to the above-mentioned aspects of the present invention. Additional features may also be incorporated in the above-mentioned aspects of the present invention. These refinements and additional features may exist individually or in any combination. For instance, various features discussed below in relation to any of the described aspects of the present invention may be incorporated into any of the described aspects of the present invention alone or in any combination.

DESCRIPTION OF THE DRAWINGS

The patent or application file contains at least one drawing executed in color. Copies of this patent or patent application publication with color drawing(s) will be provided by the Office upon request and payment of the necessary fee.

EMBODIMENTS OF THE INVENTION

Figure 1:
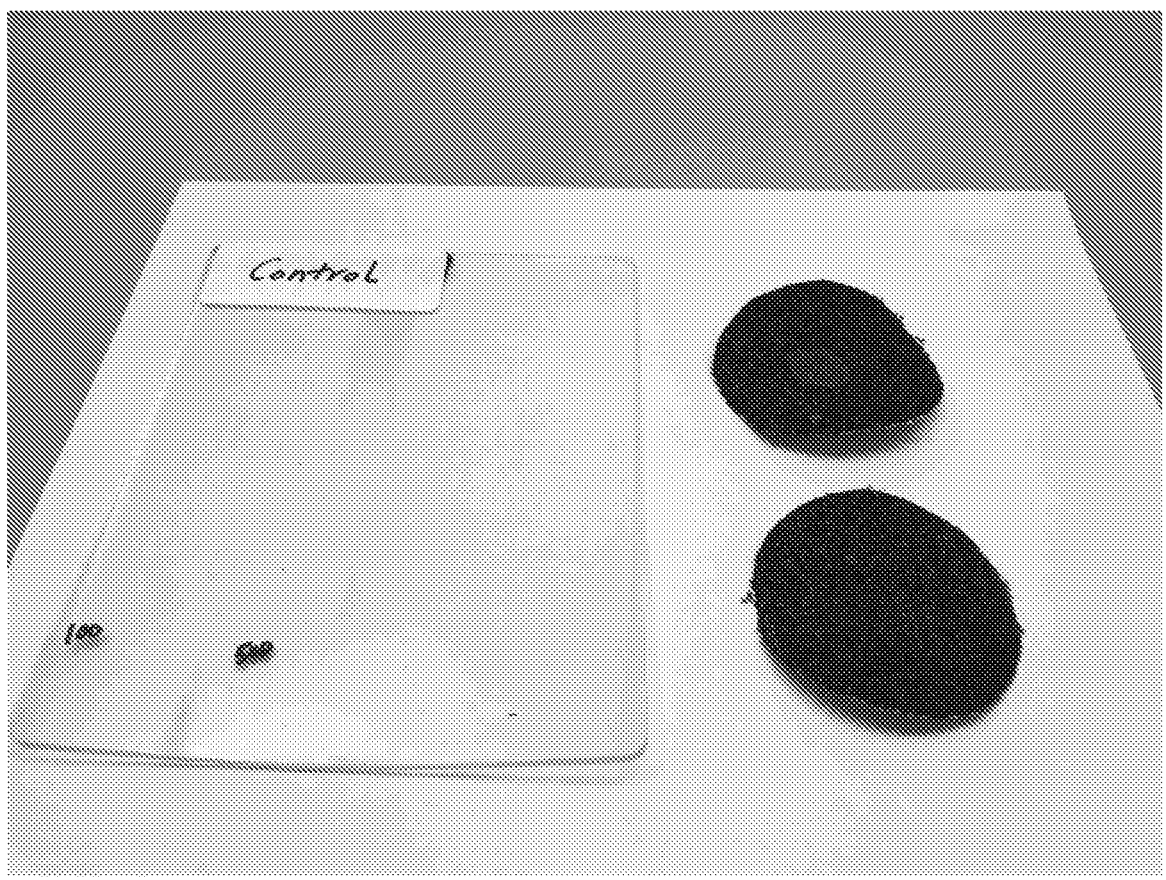
FIG. 1 is a color photograph of the Control Example polymeric article after subjected to the Blue Jean Abrasion Test and the abradant of blue jean circular cloth used in Blue Jean Abrasion Test.

In some embodiments, the present invention is directed to thermoplastic elastomer compounds. In other embodiments, the present invention is directed to polymeric articles formed from thermoplastic elastomer compounds. In further embodiments, the present invention is directed to methods of making polymeric articles. In even further embodiments, the present invention is directed to methods of improving resistance to Blue Jean Staining of polymeric articles. Required and optional features of these and other embodiments of the present invention are described.

As used herein, the term "Blue Jean Abrasion Test" means the Ford Laboratory Test Method (FLTM) BN 107-01 Crocking Test as performed with equipment, set-up, materials, and conditions as follows:

Instrument: TABER Linear Abraser—Model 5750;

Accessory: TABER Crockmeter Attachment with 16 mm Acrylic Finger;

Abradant: LEVI'S 505 Regular Cut Blue Jeans (circular cloth cut with shears from the lower part of the jean leg and positioned on the finger of the Crockmeter such that the weave is oblique to the direction of rubbing and affixed on the finger with a retaining clip);

Stroke Length: 4 inches (100 mm);

Cycle Speed: 60 cycles per minute;

Number of Cycles: 500 cycles;

Load: 9 Newtons (918 grams); and

Conditions: Temperature of 76° F. (24.4° C.) and Relative Humidity of 47% (with test specimens conditioned at least 24 hours).

As used herein, the term "Blue Jean Staining" means abrasion or discoloration from color transfer visually observable on a test specimen, such as a polymeric article, after subjecting the test specimen to the Blue Jean Abrasion Test.

As used herein, the term "Blue Jean Stain Resistant" means no abrasion or discoloration from color transfer is visually observable on a test specimen, such as a polymeric article, after subjecting the test specimen to the Blue Jean Abrasion Test.

As used herein, the term "compound" means a composition or mixture resulting from melt mixing, or compounding, a neat polymer and at least one other ingredient including but not limited to one or more additives, or one or more other polymers, or both.

As used herein, "haze" is a measure of loss of clarity as measured according to ASTM D1003. Clarity also can be assessed qualitatively by visual observation.

As used herein, the terms "formed from" or "forming" mean, with respect to a polymeric article and a compound, that the polymeric article is molded, extruded, calendered, thermoformed, or otherwise shaped from the compound. As such, the terms "formed from" or "forming" mean, in some embodiments, the article can comprise, consist essentially of, or consist of, the compound.

As used herein, the term "free of" a certain component or substance means, in some embodiments, that no amount of that component or substance is intentionally present, and, in other embodiments, that no functionally effective amount of that component or substance is present, and, in further embodiments, that no amount of that component or substance is present.

As used herein, "tackiness" is a qualitative assessment of how a surface feels to a touch of a human finger. Such a qualitative assessment can be confirmed quantitatively by measurement of kinetic coefficient of friction (COF) in a kinetic state according to ASTM D1894.

As used herein, the term "thermoplastic elastomer compound" means a compound (i) including among its ingredients at least one thermoplastic elastomer, and (ii) having properties such as physical and mechanical properties that make the compound suitable for forming (especially molding) polymeric articles. As used herein, the term "thermoplastic elastomer compound" excludes adhesive compositions.

As used herein, the term "visually observable" (including "visual observation" and other like terms) means observable (or an observation made) by an unaided human eye under common interior lighting conditions at a distance no greater than 50 centimeters from the unaided human eye.

Thermoplastic Elastomer Compounds and Polymeric Articles

Thermoplastic elastomer compounds of the present invention include acrylic block copolymer and functionalized polysiloxane.

Polymeric articles formed from thermoplastic elastomer compounds of the present invention have improved resistance to Blue Jean Staining relative to the resistance to Blue Jean Staining of a comparative polymeric article formed from a comparative thermoplastic elastomer compound which includes the same ingredients in the same amounts as the thermoplastic elastomer compound of the present invention except that the comparative thermoplastic elastomer compound excludes the functionalized polysiloxane.

In some embodiments, thermoplastic elastomer compounds of the present invention and polymeric articles formed therefrom are Blue Jean Stain Resistant.

In some embodiments, thermoplastic elastomer compounds of the present invention and polymeric articles formed therefrom exhibit reduced tackiness. For example, in some embodiments, compounds of the present invention and polymeric articles formed therefrom have a kinetic coefficient of friction of less than about 0.65 when tested using ASTM D1894.

In some embodiments, thermoplastic elastomer compounds of the present invention and polymeric articles formed therefrom exhibit substantial clarity. For example, in some embodiments, compounds of the present invention and polymeric articles formed therefrom have haze of less than about 10% when tested using ASTM D1003.

Acrylic Block Copolymer (ABC)

According to the invention, the thermoplastic elastomer compounds include acrylic block copolymer (ABC) as a thermoplastic elastomer matrix.

Suitable ABC includes conventional or commercially available ABC. A single ABC can be used or one or more different ABCs can be used in combination.

In some embodiments, the acrylic block copolymer is polymethylmethacrylate-poly(butyl acrylate)-polymethylmethacrylate triblock copolymer. Such acrylic block copolymer consists of thermoplastic "hard" blocks of polymethylmethacrylate (PMMA) as end-blocks and an elastomeric "soft" block of poly(butyl acrylate) (PBA) as a mid-block (i.e., PMMA-PBA-PMMA block copolymer).

Examples of commercially available polymethylmethacrylate-poly(butyl acrylate)-polymethylmethacrylate triblock copolymer include those available under the KURARITY brand from Kuraray America, Inc. in a number of grades, such as grades LA2250 and LA4285, which are differentiated at least by Shore A hardness. For example, grade LA2250 is reported to have a Shore A hardness of 62 and grade LA4285 is reported to have a Shore A hardness of 96. By blending these two grades, the overall Shore A hardness of the resulting compound can be adjusted to any value from about 62 to about 96.

Functionalized Polysiloxane

According to the invention, the thermoplastic elastomer compounds include functionalized polysiloxane. More commonly, polysiloxanes can be referred to as silicones.

Suitable functionalized polysiloxanes include conventional or commercially available functionalized polysiloxanes. A single functionalized polysiloxane can be used or one or more different functionalized polysiloxanes can be used in combination.

In some embodiments, the functionalized polysiloxane is hydroxy functional polydimethylsiloxane.

In some embodiments, the hydroxy functional polydimethylsiloxane has a number average molecular weight (Mn) from about 100 to about 300,000 and a viscosity from about 5 to about 1000 mPa·sec at 25° C.

In some embodiments, the hydroxy functional polydimethylsiloxane has a viscosity of about 90 mPa·sec at 25° C. and a hydroxyl value calculated on non-volatile content of about 48 mg KOH/g.

In some embodiments, the hydroxy functional polydimethylsiloxane is dihydroxypolydimethylpolysiloxane.

Non-limiting examples of commercially available polysiloxanes include the TEGOMER H-Si 2315 brand and grade of hydroxy functional polydimethylsiloxane available from Evonik. Its viscosity is about 90 mPa·sec at 25° C. Its hydroxyl value calculated on non-volatile content is about 48 mg KOH/g. Its acid value calculated on non-volatile content is about 0.5 mg KOH/g. Evonik advertises TEGOMER H-Si 2315 hydroxy functional polydimethyl siloxane to be used as a co-binder.

Optional Additives

In some embodiments, thermoplastic elastomer compounds of the present invention further include one or more optional additives.

Suitable optional additives include conventional or commercially available plastics additives. Those skilled in the art of thermoplastics compounding, without undue experimentation, can select suitable additives from available references, for example, E. W. Flick, "Plastics Additives Database," *Plastics Design Library* (Elsevier 2004).

Optional additives can be used in any amount that is sufficient to obtain a desired processing or performance property for the thermoplastic elastomer compound and/or the elastomeric film formed therefrom. The amount should not be wasteful of the additive nor detrimental to the processing or performance of the thermoplastic elastomer compound and/or the elastomeric film formed therefrom.

Non-limiting examples of optional additives include adhesion promoters; anti-fogging agents; antioxidants; antistatic agents; biocides (antibacterials, fungicides, and mildewcides); colorants including pigments and dyes; dispersants; fillers and extenders; fire and flame retardants and smoke suppressants; hardness adjusters; impact modifiers; initiators; lubricants; micas; mold release agents; oils and plasticizers; processing aids; secondary polymers; silanes, titanates and zirconates; slip and anti-blocking agents; stabilizers; stearates; ultraviolet light absorbers; viscosity regulators; and waxes.

In some embodiments, thermoplastic elastomer compounds of the present invention further include one or more of antioxidants; colorants; mold release agents; and ultraviolet light absorbers.

Ranges of Ingredients in the TPE Compounds

Table 1 below shows ranges of ingredients, in parts by weight, which can be acceptable, desirable, and preferable for some embodiments of thermoplastic elastomer (TPE) compounds of the present invention.

Thermoplastic elastomer compounds of the present invention, in some embodiments, can comprise, consist essentially of, or consist of these ingredients. Any number between the ends of the ranges is also contemplated as an end of a range, such that all possible combinations are contemplated within the possibilities of Table 1 as embodiments of compounds for use in the present invention. Unless expressly stated otherwise herein, any disclosed number is intended to refer to both exactly the disclosed number and "about" the disclosed number, such that either possibility is contemplated within the possibilities of Table 1 as embodiments of compounds for use in the present invention.

TABLE 1

Thermoplastic Elastomer Compounds (Parts by Weight)

| Ingredient | Acceptable | Desirable | Preferable |
|---|---|---|---|
| Acrylic Block Copolymer | 100 | 100 | 100 |
| Functionalized Polysiloxane | 0.05-0.50 | 0.1-0.30 | 0.15-0.25 |
| Optional UV Absorber | 0-0.50 | 0-0.30 | 0-0.20 |
| Optional Mold Release Agent | 0-0.20 | 0-0.15 | 0-0.10 |
| Optional Antioxidant | 0-0.20 | 0-0.15 | 0-0.10 |
| Optional Color Concentrate | 0-2 | 0-1 | 0-0.50 |

Processing and Methods of Making Polymeric Articles

The preparation of thermoplastic elastomer compounds of the present invention is uncomplicated once the proper ingredients have been selected. The compound can be made in batch or continuous operations.

Mixing in a continuous process typically occurs in an extruder that is elevated to a temperature that is sufficient to melt the polymer matrix with addition of all additives at the feed-throat, or by injection or side-feeders downstream. Extruder speeds can range from about 200 to about 700 revolutions per minute (rpm), and preferably from about 300 rpm to about 500 rpm. Typically, the output from the extruder is pelletized for later forming, extrusion, molding, thermoforming, foaming, calendering, and/or other processing into plastic articles.

Subsequent forming such as extrusion, molding, thermoforming, calendering, and/or other processing techniques are well known to those skilled in the art of thermoplastics polymer engineering. Without undue experimentation but with reference to publications such as "Extrusion, The Definitive Processing Guide and Handbook", "Handbook of Molded Part Shrinkage and Warpage", "Specialized Molding Techniques", "Rotational Molding Technology", and "Handbook of Mold, Tool and Die Repair Welding", all part of the Plastics Design Library series published by Elsevier, one can make articles of any conceivable shape and appearance using compounds of the present invention.

In some embodiments, thermoplastic elastomer compounds of the present invention are formed by injection molding processes into polymeric articles.

Some aspects of the invention are directed to methods of making a polymeric article that is Blue Jean Stain Resistant. Such methods include the steps of (a) providing a thermoplastic elastomer compound according to the present invention, and (b) forming the thermoplastic elastomer compound to provide the polymeric article, wherein the polymeric article is Blue Jean Stain Resistant.

Methods of Improving Resistance to Blue Jean Staining

Some aspects of the invention are directed to methods of improving resistance to Blue Jean Staining of a polymeric article. Such methods include the step of using a thermoplastic elastomer compound according to the present invention to form the polymeric article.

The resulting polymeric article has improved resistance to Blue Jean Staining relative to the resistance to Blue Jean Staining of a comparative polymeric article formed from a comparative thermoplastic elastomer compound which includes the same ingredients in the same amounts as the thermoplastic elastomer compound of the present invention except that the comparative thermoplastic elastomer compound excludes the functionalized polysiloxane.

USEFULNESS OF THE INVENTION

Thermoplastic elastomer compounds of the present invention can be useful for making any type of polymeric article, or any polymeric component of a multi-component article, which requires desirable properties of TPEs, such as flexibility and elongation as well as low tackiness (i.e., low coefficient of friction) and good clarity (i.e., low haze), while also advantageously benefitting from having improved resistance to Blue Jean Staining or being Blue Jean Stain Resistant.

Thermoplastic elastomer compounds of the present invention have potential for use in applications in many different industries, including but not limited to: automotive and transportation; consumer products; consumer electronics; healthcare and medical; household appliances; and other industries or applications benefiting from the compound's unique combination of properties.

In some embodiments, thermoplastic elastomer compounds of the present invention can be especially useful for making protective cases for personal electronic devices such as smart phones or other devices that a user frequently places into and removes from a garment or clothing article made from denim or other dyed fabric, such as a pocket of blue jeans.

EXAMPLES

Non-limiting examples of thermoplastic elastomer compounds of various embodiments of the present invention are provided.

Table 2 below shows sources of ingredients for the thermoplastic elastomer compounds of the Control Example and Example 1.

TABLE 2

| Ingredient Description | Brand | Source |
|---|---|---|
| Polymethylmethacrylate-poly(butyl acrylate)-polymethylmethacrylate triblock copolymer | KURARITY LA4285 | Kuraray |
| Polymethylmethacrylate-poly(butyl acrylate)-polymethylmethacrylate triblock copolymer | KURARITY LA2250 | Kuraray |
| Dihydroxypolydimethylsiloxane | TEGOMER H-Si 2315 | Evonik |
| Phenol, 2-(2H-benzotriazol-2-yl)-4,6-bis(1-methyl-1-phenylethyl) | TINUVIN 234 | BASF |
| Zinc stearate | SYNPRO S1200 | Valtris |
| Tris(2,4-ditert-butyl phenyl) phosphite | IRGAFOS 168 | BASF |
| Color concentrate | POLYONE Proprietary | PolyOne |

To prepare the Examples, the ingredients all together were compounded and extruded as pellets on a twin screw extruder at 188° C. and 500 rpm. Subsequently, the extruded pellets were injection molded at 200° C. into specimens having dimensions of 15.24 cm×12.7 cm×0.30 cm (6 in×5 in×0.12 in) and evaluated for the reported properties.

Table 3 below shows the formulations and certain properties of the Control Example and Example 1.

TABLE 3

| Example | Control Wt. Parts | 1 Wt. Parts |
|---|---|---|
| Ingredient | | |
| KURARITY LA2250 | 60.00 | 60.00 |
| KURARITY LA4285 | 39.50 | 39.50 |
| TEGOMER H-Si 2315 | — | 0.20 |
| TINUVIN 234 | 0.15 | 0.15 |
| SYNPRO S1200 | 0.10 | 0.10 |
| IRGAFOS 168 | 0.10 | 0.10 |
| POLYONE Color Concentrate * | 0.50 | 0.50 |
| TOTAL | 100.35 | 100.55 |
| Properties | | |
| Blue Jean Staining | Yes | No |
| Hardness (Shore A) (ASTM D2240, 10 s delay) | 73 | 76 |
| Specific Gravity (ASTM D792) | 1.09 | 1.09 |
| Tensile Strength (psi) (ASTM D412, Die C) | 1700 | 1748 |
| Elongation (%) (ASTM D412, Die C) | 275 | 303 |
| Clarity (Visual Observation) | Clear | Clear |
| Tackiness (Touch by Hand) | Some Tackiness | Smooth |

* Color concentrate was included only for purposes of adjusting aesthetic appearance of the specimen. It is believed the color concentrate does not affect results of the Blue Jean Abrasion Test or other reported properties.

Figure 2:
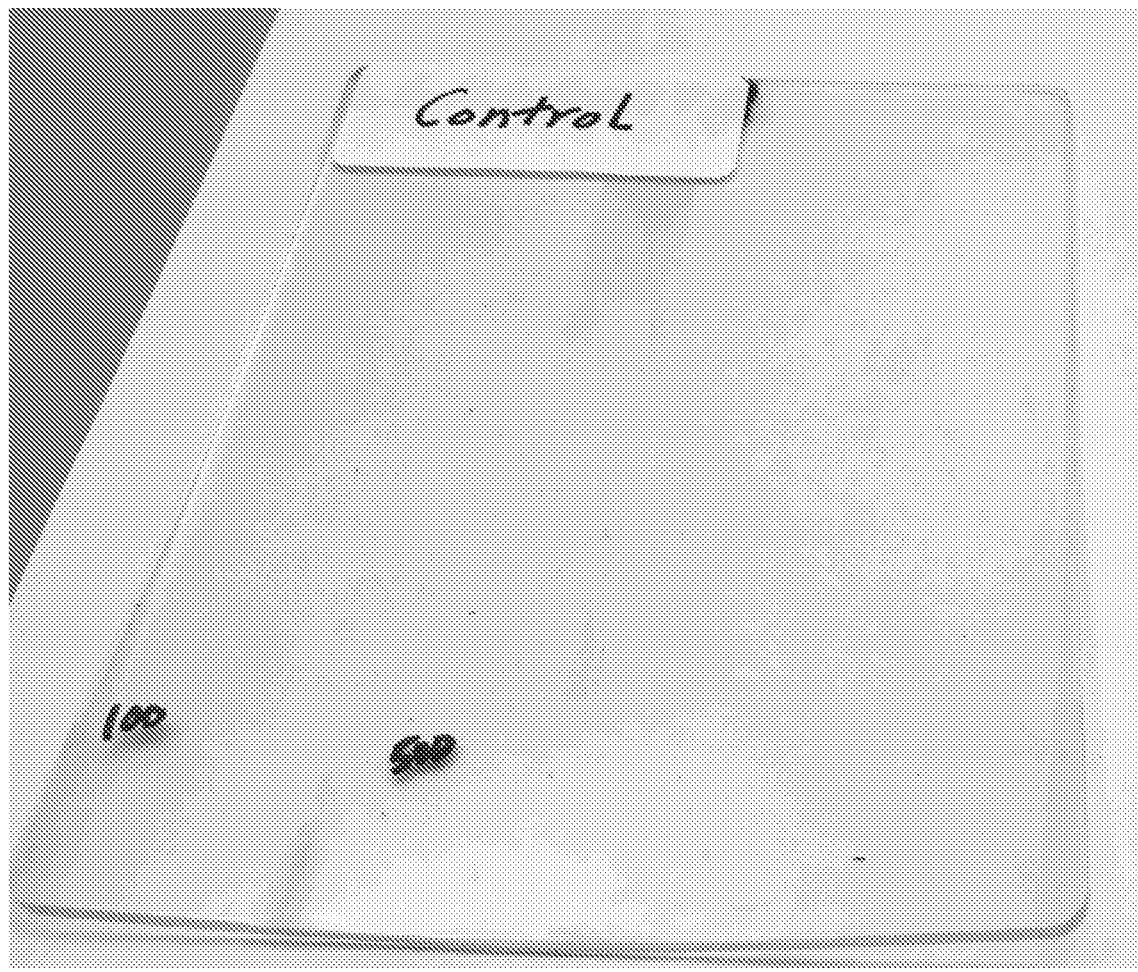
FIG. 2 is a color photograph showing a closer view of the Control Example polymeric article after subjected to the Blue Jean Abrasion Test depicted in FIG. 1.

As depicted in FIGS. 1 and 2, Blue Jean Staining is visually observable on the surface of the Control Example polymeric article.

Figure 3:
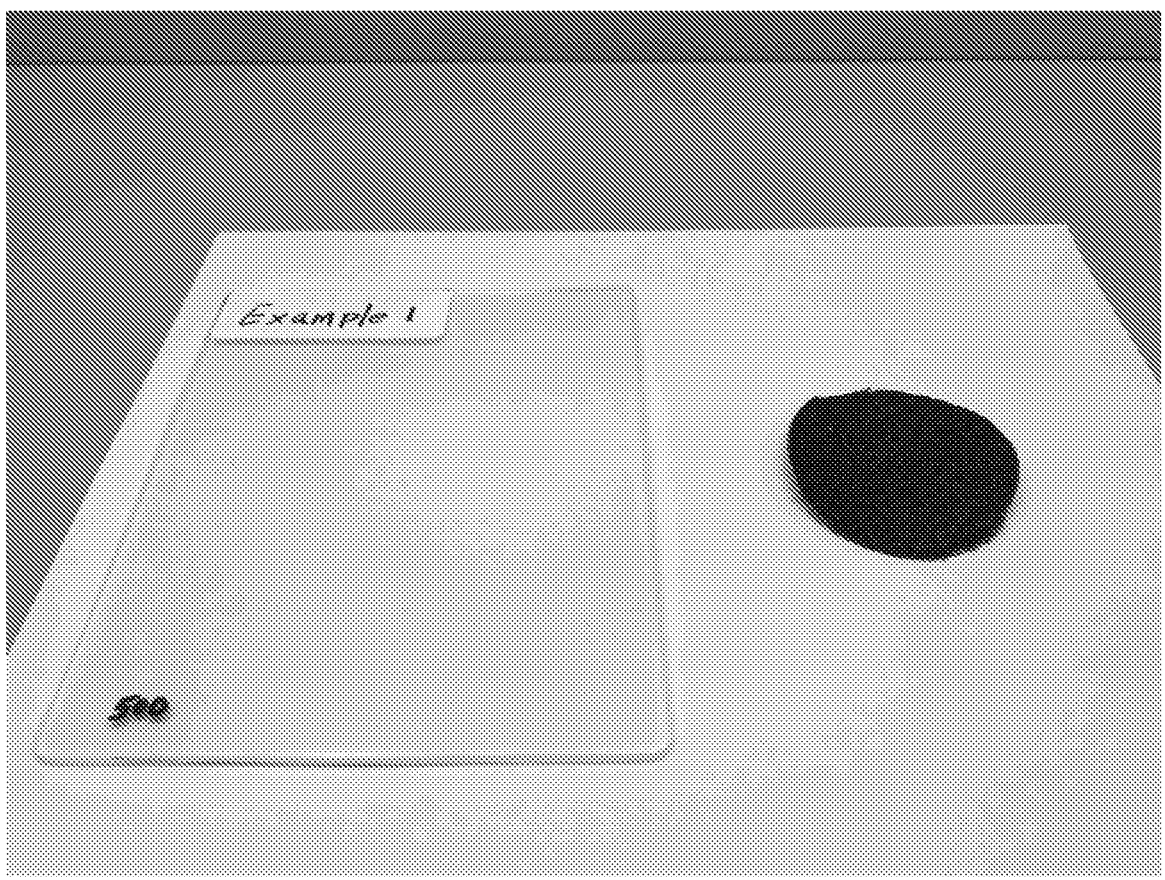
FIG. 3 is a color photograph of the Example 1 polymeric article after subjected to the Blue Jean Abrasion Test and the abradant of blue jean circular cloth used in Blue Jean Abrasion Test.
Figure 4:
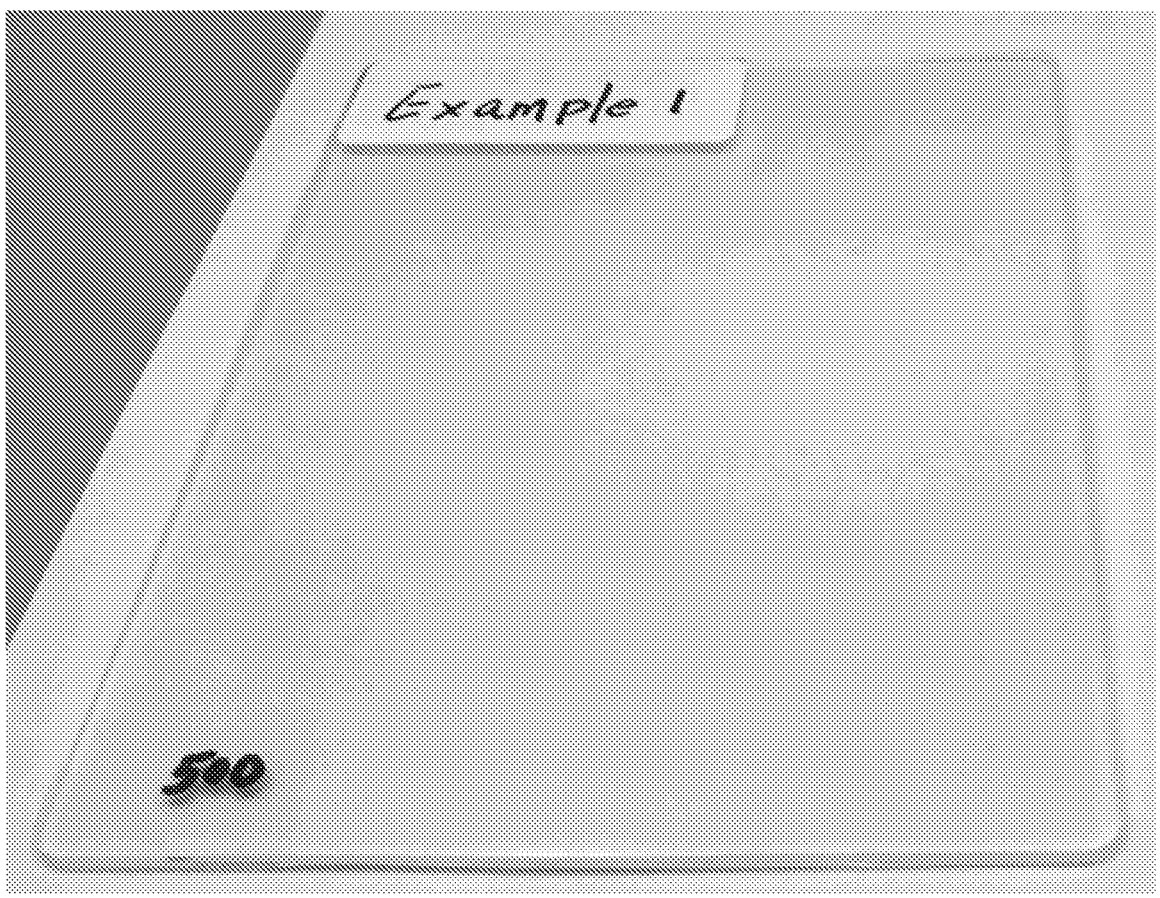
FIG. 4 is a color photograph showing a closer view of the Example 1 polymeric article after subjected to the Blue Jean Abrasion Test depicted in FIG. 3.

Surprisingly, as depicted in FIGS. 3 and 4, no Blue Jean Staining is visually observable on the surface of the Example 1 polymeric article and the Example 1 polymeric article is characterized as Blue Jean Stain Resistant in accordance with the present invention.

Without undue experimentation, those having ordinary skill in the art can utilize the written description of the present invention, including the Examples, to formulate thermoplastic elastomer compounds and make polymeric articles exhibiting improved resistance to Blue Jean Staining.

All documents cited in the Embodiments of the Invention are incorporated herein by reference in their entirety unless otherwise specified. The citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of the present invention.

What is claimed is:
1. A thermoplastic elastomer compound comprising:
   (a) 100 parts by weight acrylic block copolymer; and
   (b) 0.05-0.5 parts by weight functionalized polysiloxane per 100 parts by weight acrylic block copolymer, wherein the functionalized polysiloxane is hydroxy functional polydimethylsiloxane;
   (c) 0-0.5 parts by weight UV absorber per 100 parts by weight acrylic block copolymer;
   (d) 0-0.2 parts by weight mold release agent per 100 parts by weight acrylic block copolymer;
   (e) 0-0.2 parts by weight antioxident per 100 parts by weight acrylic block copolymer;

(f) 0-0.5 parts by weight color concentrate per 100 parts by weight acrylic block copolymer;

wherein the acrylic block copolymer forms a polymer matrix and the functionalized polysiloxane is incorporated within the polymer matrix by mixing the functionalized polysiloxane and the acrylic block copolymer at a temperature sufficient to melt the acrylic block copolymer; and the thermoplastic elastomer compound is blue jean stain resistant.

2. The compound of claim 1, wherein the acrylic block copolymer is polymethylmethacrylate-poly(butyl acrylate)-polymethylmethacrylate triblock copolymer.

3. The compound of claim 1, wherein the hydroxy functional polydimethylsiloxane has a number average molecular weight (Mn) of from about 100 to about 300,000 and a viscosity of from about 5 to about 1000 mPa sec at 25° C.

4. The compound of claim 1, wherein the hydroxy functional polydimethylsiloxane has a viscosity of about 90 mPa·sec at 25° C. and a hydroxyl value calculated on non-volatile content of about 48 mg KOH/g.

5. The compound of claim 1, wherein the hydroxy functional polydimethylsiloxane is dihydroxypolydimethylpolysiloxane.

6. The compound of claim 1, wherein the acrylic block copolymer has a Shore A hardness and wherein the compound further comprises a different acrylic block copolymer having a different Shore A hardness.

7. The compound of claim 1, wherein the functionalized polysiloxane is present in the compound at about 0.15 to about 0.25 parts by weight per one hundred parts by weight of acrylic block copolymer.

8. A polymeric article formed from the compound of claim 1.

9. A method of making a polymeric article, the method comprising the steps of:
 (a) preparing a thermoplastic elastomer compound comprising
  (1) 100 parts by weight acrylic block copolymer; and
  (2) 0.05-0.5 parts by weight functionalized polysiloxane per 100 parts by weight acrylic block copolymer, wherein the functionalized polysiloxane is hydroxy functional polydimethylsiloxane;
  (3) 0-0.5 parts by weight UV absorber per 100 parts by weight acrylic block copolymer;
  (4) 0-0.2 parts by weight mold release agent per 100 parts by weight acrylic block copolymer;
  (5) 0-0.2 parts by weight antioxident per 100 parts by weight acrylic block copolymer;
  (6) 0-0.5 parts by weight color concentrate per 100 parts by weight acrylic block copolymer;
 wherein the thermoplastic elastomer compound is prepared by mixing the functionalized polysiloxane into the acrylic block at a temperature sufficient to melt the acrylic block copolymer providing the compound of claim 1; and
 (b) forming the compound to provide the polymeric article, wherein the polymeric article is blue jean stain resistant.

10. A method of improving resistance to blue jean staining of a polymeric article, the method comprising the step of using the compound of claim 1 to form the polymeric article.

11. The polymeric article of claim 8, wherein the polymeric article is a pellet.

12. The method of making a polymeric article of claim 9, wherein the step of forming the compound to provide the polymeric article is performed by a process selected from the group consisting of extrusion, thermoforming, foaming, and calendering.

13. The method of making a polymeric article of claim 9, wherein the step of forming the compound to provide the polymeric article is performed by injection molding.

14. The compound of claim 1, wherein the compound has a haze of less than about 10% when tested using ASTM D1003.

15. The compound of claim 1, wherein the compound has a kinetic coefficient of friction of less than about 0.65 when tested using ASTM D1894.

16. The compound of claim 1, wherein the compound has a haze of less than about 10% when tested using ASTM D1003 and a kinetic coefficient of friction of less than about 0.65 when tested using ASTM D1894.

* * * * *